E. W. FOLSOM.
Curtain-Cord Fastener.

No. 216,733. Patented June 24, 1879.

UNITED STATES PATENT OFFICE.

ELIAS W. FOLSOM, OF GREENBUSH, ASSIGNOR OF ONE-HALF HIS RIGHT TO PETER J. RORABECK, OF WEST TROY, NEW YORK.

IMPROVEMENT IN CURTAIN-CORD FASTENERS.

Specification forming part of Letters Patent No. 216,733, dated June 24, 1879; application filed May 2, 1876.

*To all whom it may concern:*

Be it known that I, ELIAS W. FOLSOM, of the town of Greenbush, in the county of Rensselaer and State of New York, have invented new and useful Improvements in Curtain-Fixtures, which improvements are fully described in the following specification and accompanying drawings, in which—

Figure 1:
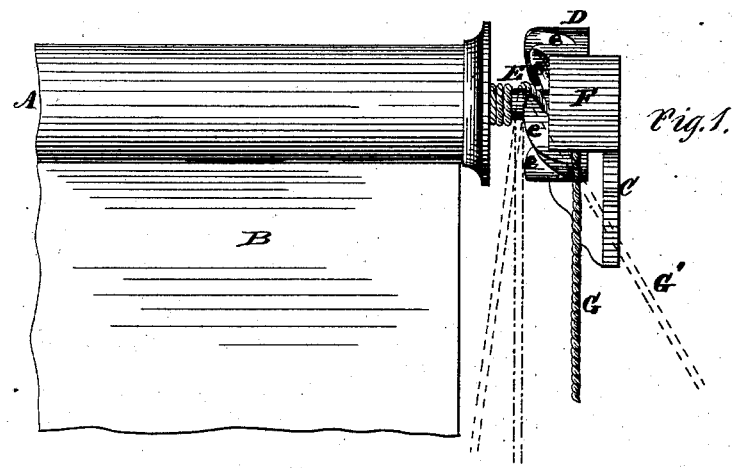
Figure 2:
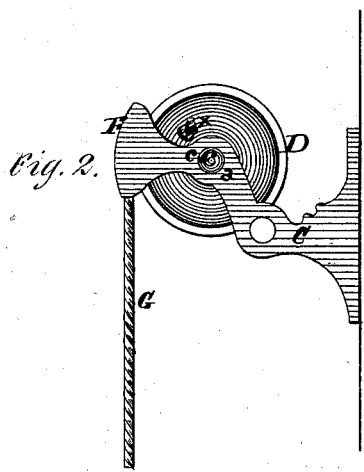
Figure 3:
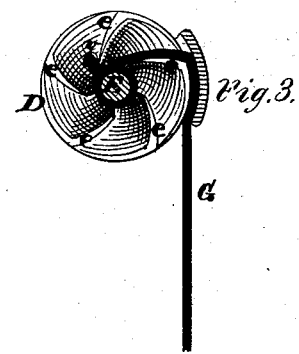

Figure 1 represents a front elevation of my improved curtain-fixture. Fig. 2 is an outer end view of the same; and Fig. 3 is a view of the inner side end view of the brake and pulley.

The object of my invention is to furnish a device by which the roller of a curtain will be made to revolve in a direction to roll the curtain up on the same when the cord is pulled, and the revolutions of the said roller may be stopped at any point at any time by simply carrying the end of the cord to one side away from the curtain, or from a line drawn vertically from the pulley, and which will permit the curtain to readily unroll from the roller to any desired length, and be then surely stopped and held.

In the drawings, A represents a roller of wood or other material, made in any of the forms known. B is the curtain—shown partly rolled around the roller—to be lowered or raised by my device and held. The end of the roller opposite the end shown is supported in a bearing from a bracket in the manner heretofore practiced.

C is a bracket, intended to be secured to the casing of the window. The said bracket is provided with a hole, $a$, which is to act as a bearing for the pintle $c$ of the pulleys D and E, which pulleys are attached to the end of the roller A in any of the ways practiced by the trade.

The pulley D is made of circular form in its outer periphery toward the bracket C, and has made with its side facing the end of the roller a series of curved radial inclined projections, $e$. The said curved radial inclined projections commence at near the periphery of the pulley E, and run outward to the periphery of the pulley D, as shown in Fig. 3. The face sides of the said projections are flat in the direction parallel with the plane of the axis of the pulleys D and E, as shown in Fig. 1, while the opposite sides of said projections curve under and inward, and form cavities or recesses, in which the cord may lodge when it is desired to check the revolution of the roller and hold it from turning. The pulley E is made with a less diameter than the pulley D, as shown in Figs. 1 and 3.

Made with the bracket C, and projecting slightly past the periphery of the pulley D, is the brake-piece F, which brake-piece projects inward toward the end of the roller A, so as to cover a portion of the outer circumference of the pulley D, and at least the outer end of one of the projections, $e$, as shown. G is a cord, secured to the pulley E by passing its end through the hole $v$, made in the pulley D at near the outer circumference of pulley E, as shown in Fig. 3, when the end is knotted, as shown by knot $x$ on the rear side, as shown in Fig. 2.

The manner in which I proceed to arrange the several parts of my improved device for operation is as follows: I secure to the casing of the window the bracket C and the opposite end bracket. (Not shown.) I then roll the curtain around the roller A, the pulleys D and E having been previously secured to the end thereof, as shown, with the cord G secured as described, but not coiled around the pulley E. The roller is then to be placed in position with the pintle $c$ entering the bearing $a$, and the opposite end pintle in its opposite end bearing, (not shown,) when the device, with the curtain, will be ready for operation.

To lower the curtain, the operator will grasp the end of cord G and permit the lower end of the curtain to descend by gravity as it unrolls from the roller, the operator letting the cord gently and gradually slip through his fingers until the curtain has been lowered to the point desired, when he will carry the end of the cord obliquely to the right hand, as indicated by dotted lines G', when the cord will lodge on the face side of some one of the radial inclined projections $e$, and be carried under the brake-piece F, as shown in Figs. 1 and 3. In the operation of lowering the curtain the revolutions of the roller causing the unrolling of the same will also cause the cord G to be coiled up around the small pulley, E, to a proportionate distance in its length. When it is desired to raise the curtain the operator will pull on the cord C in a vertical direction, when the large pulley, D, will revolve partially around and carry the projection, $e$, on which the cord lodged, out from under the brake-piece F, and cause the cord coiled around the small pulley, E, to uncoil from the same, which uncoiling of the said cord will cause the roller to revolve in a direction to roll up the curtain; and when the curtain has been raised to the point desired, the operator will again carry the cord to the right, as to dotted lines G' in Fig. 1, to throw the same on the face of some one of the projections $e$, as before, when the brake-piece will bite on the cord and prevent the pulley D and its attached roller from revolving, when the curtain will be securely held.

I am aware that a cord running over a small pulley adjacent to a grooved pulley, and revolving with it in a yoke having a fixed brake-piece attached to hold said cord, has been used. Such a combination of devices forms no part of my invention, as it is plainly seen that it would not be adapted as a means to revolve a roller carrying a curtain intended to be lowered by its unrolling from the roller, and raised by being rolled up on the same by drawing on a cord coiled around the pulley attached to said roller as in my invention.

I am also aware that pulleys having one of their sides notched or recessed, and a fixed piece operating as a brake have also been used for stretching cords or ropes, and holding the same when stretched. Such a device forms no part of my invention, as it would fail to revolve a roller for raising a curtain, and check its movement and hold it at any desired point from turning, for the reason that there is no cord attached to a small pulley connected with the notched pulley and roller, as is in my invention.

What I claim as my invention, and desire to secure by Letters Patent, is—

The combination, with roller A, adapted to be revolved for rolling up and lowering a curtain attached to the same, of the small pulley, E, larger pulley, D, having radial inclined projections $e$, stationary brake-piece, F, and cord G, having one of its ends fixed to said small pulley, and all combined and constructed as above set forth for operation as described.

ELIAS W. FOLSOM.

Witnesses:
 JAMES AKEN,
 JAMES W. PALMER.